United States Patent [19]

Okui et al.

[11] Patent Number: 4,909,633
[45] Date of Patent: Mar. 20, 1990

[54] MULTI-CHANNEL SPECTRAL LIGHT MEASURING DEVICE

[75] Inventors: Yoshihiro Okui, Daito; Seiiku Ito, Amagasaki; Masami Sugiyama, Toyonaka, all of Japan

[73] Assignee: Minolta Camera Kabushiki Kaisha, Osaka, Japan

[21] Appl. No.: 48,678

[22] Filed: May 11, 1987

[30] Foreign Application Priority Data

May 12, 1986 [JP] Japan ................................. 61-108289
May 13, 1986 [JP] Japan ................................. 61-110262
Nov. 19, 1986 [JP] Japan ................................. 61-275694

[51] Int. Cl.⁴ .................................................. G01J 3/50
[52] U.S. Cl. .................................. 356/405; 356/406; 356/419; 250/226; 250/227.23
[58] Field of Search .............. 250/226, 227; 356/402, 356/405, 406, 407, 414, 416, 419, 425

[56] References Cited

U.S. PATENT DOCUMENTS

| | | | |
|---|---|---|---|
| 3,709,612 | 1/1973 | Clemens | 250/227 |
| 4,162,839 | 7/1979 | Mashimo et al. | 354/23 |
| 4,465,370 | 8/1984 | Yuasa et al. | 356/224 |
| 4,500,204 | 2/1985 | Ogura | 250/227 |
| 4,696,570 | 9/1987 | Joliot et al. | 356/334 X |
| 4,714,341 | 12/1987 | Hamaguri et al. | 356/41 |

FOREIGN PATENT DOCUMENTS 81702 6/1983 European Pat. Off. ............ 356/416
61-80018 4/1986 Japan .

OTHER PUBLICATIONS

Yuasa et al, "Color-Difference Colorimeter CR-100", *Minolta Techno Report*, No. 1, 1984.

Primary Examiner—F. L. Evans
Attorney, Agent, or Firm—Burns, Doane, Swecker & Mathis

[57] ABSTRACT

A light measuring device wherein a correct measured value can be obtained even if incident light varies in time or a luminance or brightness of an object for measurement is insufficient. The device comprises a branched optical fiber of a random specification having therein three mutually independent light transmission paths for introducing light from a common input end to three output ends. The input end of the optical fiber is located at a slightly defocused position of an objective lens while the output ends are individually opposed to three light receiving elements having different spectral sensitivities. Three components of light are simultaneously converted into electric signals and then into digital values by circuit means each including a double integration analog to digital converter. When a luminance is insufficient at a light receiving element, the gain of the associated analog to digital converter can be adjusted so as to assure appropriate measurement of light.

6 Claims, 13 Drawing Sheets

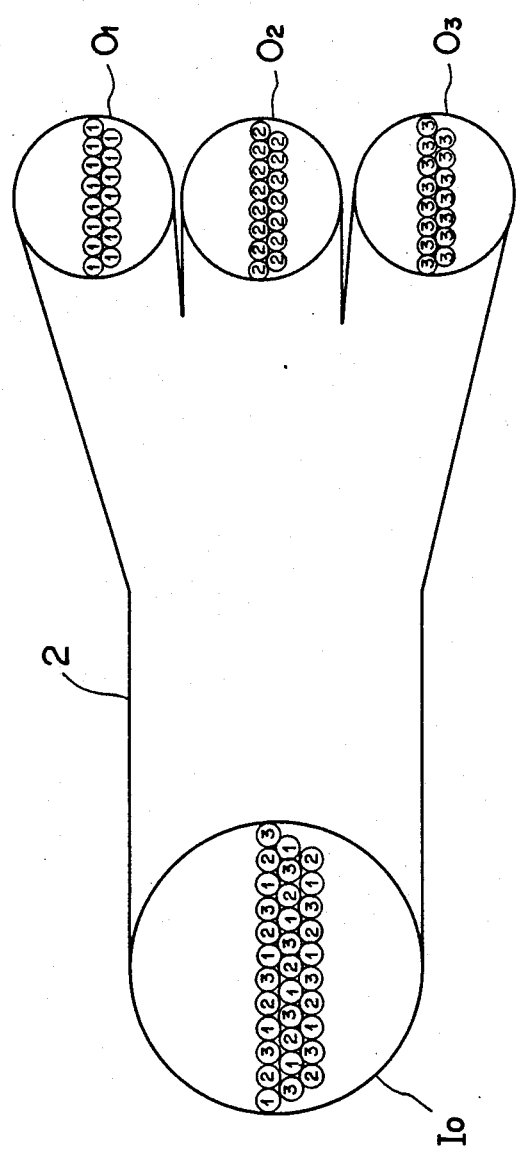

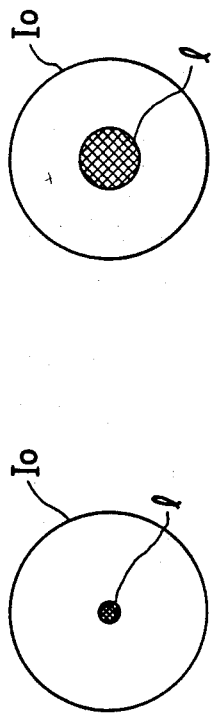

Relative value of output light amount

Position of center of incident light flux

Relative value of output light amount

Position of center of incident light flux

MULTI-CHANNEL SPECTRAL LIGHT MEASURING DEVICE

BACKGROUND OF THE INVENTION

1. Field of the Invention

This invention relates to a light measuring device for use with a spot colorimeter or a multicolor radiation thermometer for receiving and converting a plurality of components of light having different wavelengths from analog to digital values to obtain data to be input to a microcomputer or the like.

2. Description of the Prior Art

Conventionally, a luminance meter normally has such a structure that a light receiving element is placed at a focal position of a lens for condensing incident light. In the case of a spot colorimeter of the noncontact type being a photoelectric colorimeter of such a luminance meter type, three light receiving elements having spectral sensitivities $\bar{x}_\lambda$, $\bar{y}_\lambda$, $\bar{z}_\lambda$ are used, and accordingly incident light must be divided into three components.

Here, the spectral sensitivities $\bar{x}_\lambda$, $\bar{y}_\lambda$, $\bar{z}_\lambda$ are sensitivities which conform to a vision of human beings as provided by the CIE (Commission International de l'Eclairage) XYZ colorimetric system.

It is to be noted that chromaticities x, y are determined from tristimulus values X, Y, Z detected by light receiving elements having spectral sensitivities $\bar{x}_\lambda$, $\bar{y}_\lambda$, $\bar{z}_\lambda$, respectively, and are given by following equations:

$$x = \frac{X}{X + Y + Z}$$

$$y = \frac{Y}{X + Y + Z}$$

Meanwhile, a luminance is determined from Y.

As described above, in order for incident light to be received by 3 light receiving elements which have different spectral sensitivities, it is necessary to divide the incident light into three components. In order to divide incident light into 3 components of different wavelengths, conventionally there are two methods including a method (1) to use a half mirror to divide incident light into 3 components of different wavelengths, and another method (2) to rotate a rotary disk having a plurality of filters mounted thereon to divide incident light with respect to time so that individual components of different wavelengths may be received by respective light receiving elements.

However, the conventional methods described above have following drawbacks:

In the case of the former method wherein a half mirror is used, light receiving elements readily undergo bad optical influences from a lens barrel to cause an error in a stimulus value of each light receiving element, and there is a severe restriction over an arrangement that mounting locations of individual light receiving elements must be specified strictly with respect to incident light.

On the other hand, in the case of the latter time dividing method, when incident light varies with respect to time, a ratio between tristimulus values varies, which will also make a factor of an error. Further, the latter method specifically requires a motor for rotating a rotary disk with filters and a motor controller and is thus complicated in structure. Besides, it is also a problem that it is difficult to synchronize analog to digital conversion of data produced by light receiving elements with rotation of the specific motor.

Further, a conventional photoelectric colorimeter is constituted such that when levels of outputs of amplifiers of the variable gain type for tristimulus values X, Y, Z upon measurement of such tristimulus values X, Y, Z are not within an appropriate range, the gains of the variable gain type amplifiers for the tristimulus values are collectively controlled to the same level.

However, in the case of a photoelectric colorimeter of the type just mentioned, following problems are involved with respect to calculation of a luminance (or brightness) Y.

In particular, depending upon characteristics of a light source, the sensitivity of a light receiving element for a stimulus value Y may sometimes be insufficient. In such a case, if gains of variable gain type amplifiers for all of tristimulus values X, Y, Z are collectively controlled to the same level, there is no problem with respect to calculations of the chromaticities x, y, but with respect to a calculation of a luminance (or brightness) Y, there is a problem that a number of figures required for indication on a display device may not be assured and accordingly the luminance (or brightness) Y cannot be indicated in a definitely discernible condition.

Further, for a colorimeter wherein light from an object for measurement is introduced to a plurality of light receiving elements using a lens system, it has been proposed to locate the individual light receiving elements at slightly defocused positions of the lens system (Japanese patent laid-open No. 61-80018). In the prior art just mentioned, the arrangement of light receiving elements and circuit systems is restricted by such a lens system.

In a colorimeter, light from an object for measurement must necessarily be introduced uniformly to three light receiving elements which have different spectral sensitivities for tristimulus values $\bar{x}_\lambda$, $\bar{y}_\lambda$, $\bar{z}_\lambda$. Thus, it may be advisable to locate an incoming end of a multi-divided or branched optical fiber at an image forming plane of a lens system on which light to be measured is focused by the lens system while light receiving elements are located adjacent outgoing ends of the multi-divided optical fiber. In this instance, in order to make light receiving levels of light receiving elements uniform, preferably the multi-divided optical fiber is of a random specification wherein a large number of optical fiber strands are arranged at random. However, according to the method, the uniformity of levels of received light incident to the individual light receiving elements depends upon randomness in arrangement of optical fiber strands in the multidivided optical fiber, and there is a technical limitation to promotion of the randomness. It is also a problem that such promotion of the randomness will result in rise of the cost.

SUMMARY OF THE INVENTION

It is an object of the present invention to provide a light measuring device wherein a structure for dividing incident light is simplified and restrictions in arrangement of light receiving elements are moderated and which does not cause an error in a measured value even if incident light varies in time.

It is another object of the invention to provide a light measuring device wherein a luminance (or brightness) Y sufficient to allow clear indication of a stimulus value Y can be obtained even where the sensitivity of a light receiving element for the stimulus value Y is insufficient depending upon characteristics of a light source.

It is a further object of the invention to provide a light dividing device which can distribute light for measurement uniformly to individual light receiving elements and wherein an arrangement of light receiving elements and/or circuit systems is not limited by an optical system.

The above and other objects, features and advantages of the present invention will become apparent from the following description and the appended claims, taken in conjunction with the accompanying drawings.

BRIEF DESCRIPTION OF THE DRAWINGS

FIG. 10 is a perspective view, in diagrammatic representation, showing the modified optical system of FIG. 9;

FIGS. 11a and 11b are diagrammatic representations illustrating relations between a light incoming end and an incident light flux in the optical systems of FIGS. 1 and 9, respectively;

DETAILED DESCRIPTION OF THE PREFERRED EMBODIMENTS

Figure 1:
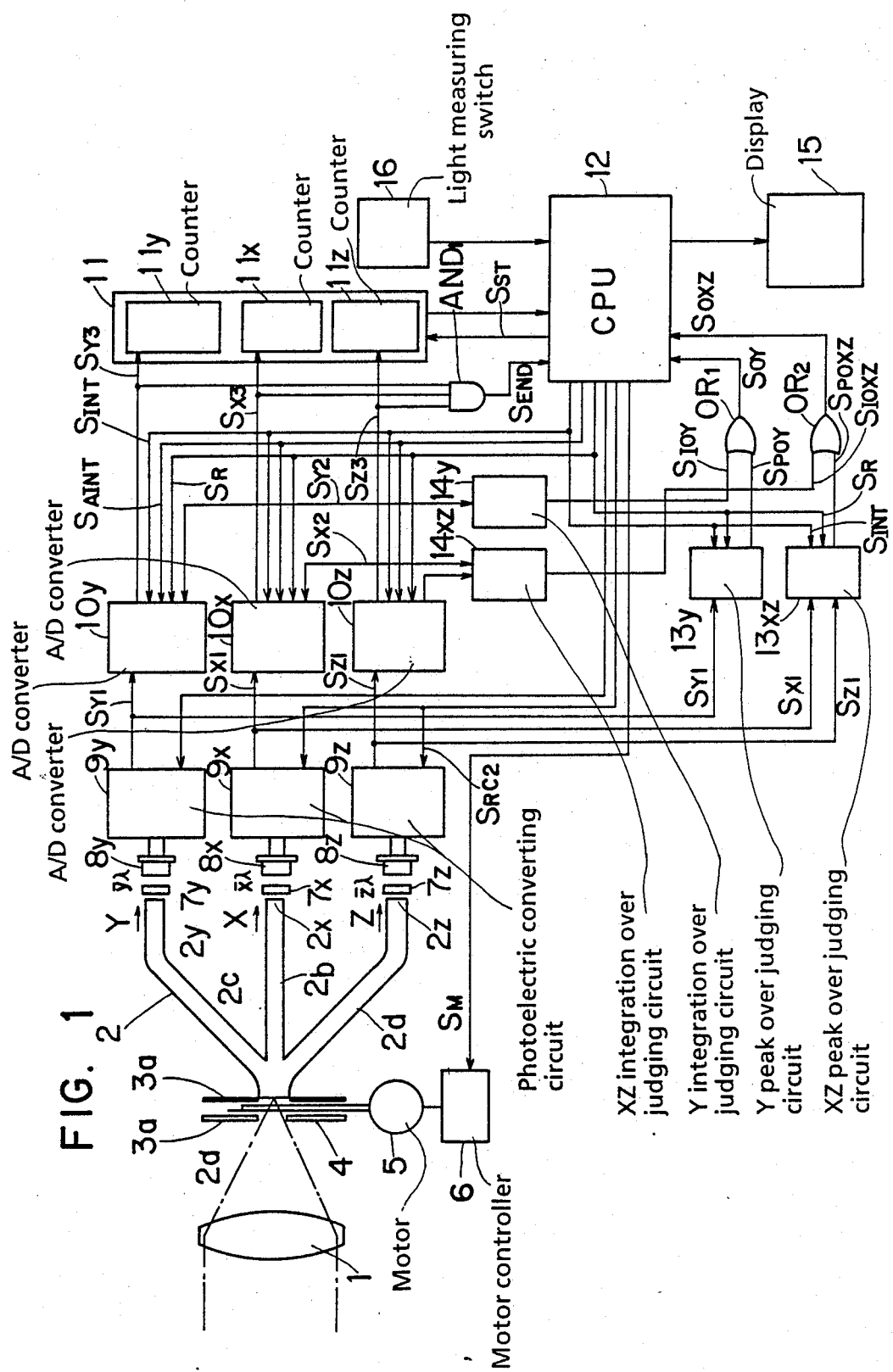
FIG. 1 is a block diagram of a spot colorimeter of the non-contact type illustrating a first embodiment of the present invention.

Referring first to FIG. 1 which illustrates a first embodiment of the present invention, a spot colorimeter of the non-contact type shown includes an objective lens 1, and a multi-divided or branched optical fiber 2 having a single common input end 2a located at a focal position of the objective lens 1 and three output ends 2x, 2y, 2z at ends of three light transmitting paths 2b, 2c, 2d defined by three branches of the optical fiber 2. Two mask plates 3a, 3b are located in front of the input end 2a of the optical fiber 2, and a chopper 4 of the oscillation type is interposed between the mask plates 3a, 3b. The chopper 4 is connected to be oscillated by a motor 5 which is controlled by a motor controller 6 in response to a motor controlling signal $S_M$ delivered from a central processing unit (CPU) 12.

The spot colorimeter further includes three filters 7x, 7y, 7z located in an opposing relationship to the output ends 2x, 2y, 2z of the optical fiber 2 and having different transmission wavelengths, and three light receiving elements 8x, 8y, 8z located in an opposing relationship to the filters 7x, 7y, 7z, respectively. The spectral sensitivity $\bar{x}_\lambda$ is specified by characteristics of the filter 7x and the light receiving element 8x, the spectral sensitivity $\bar{y}_\lambda$ by characteristics of the filter 7y and the light receiving element 8y, and the spectral sensitivity $\bar{z}_\lambda$ by characteristics of the filter 7y and the light receiving element 8z.

The spot colorimeter further includes photoelectric converting circuits 9x, 9y, 9z each constituted from an I-V converting circuit which converts electric current generated by the light receiving element 8x, 8y, 8z, respectively, linearly into a corresponding voltage. The photoelectric converting circuit 9y which delivers a stimulus value Y corresponding to a luminance has four ranges and is controlled to select one of the four ranges in response to a range change-over signal $S_{RC1}$ from the CPU 12. The photoelectric converting circuits 9x, 9z which deliver stimulus values X, Z, respectively, each have three ranges and are each controlled to select one of the three ranges in response to another range change-over signal $S_{RC2}$ from the CPU 12.

Double integration analog to digital converters 10x, 10y, 10z are connected to receive signals $S_{X1}$, $S_{Y1}$, $S_{Z1}$ of the stimulus values X, Y, Z from the photoelectric converting circuits 9x, 9y, 9z and convert the thus received signals $S_{X1}$, $S_{Y1}$, $S_{Z1}$ from analog into digital values. The double integration analog to digital converters 10x, 10y, 10z start their respective integrating operations in response to an integration signal $S_{INT}$ from the CPU 12 whereas they start their inverse integrating operations in response to an inverse integration signal $S_{AINT}$ from the CPU 12, and they are reset by a reset signal $S_R$ from the CPU 12.

A counter device 11 includes three counters 11x, 11y, 11z connected to receive output signals $S_{X3}$, $S_{Y3}$, $S_{Z3}$ of the analog to digital converters 10x, 10y, 10z, respectively, for simultaneously counting clock signals delivered from a clock generator not shown. Count values of the counters 11x, 11y, 11z are coupled to the CPU 12.

Output signals $S_{X3}$, $S_{Y3}$, $S_{Z3}$ of the analog to digital converters 10x, 10y, 10z are coupled to an AND gate $AND_1$ which is connected to deliver an analog to digital conversion completion signal $S_{END}$ to the CPU 12.

Figure 2:
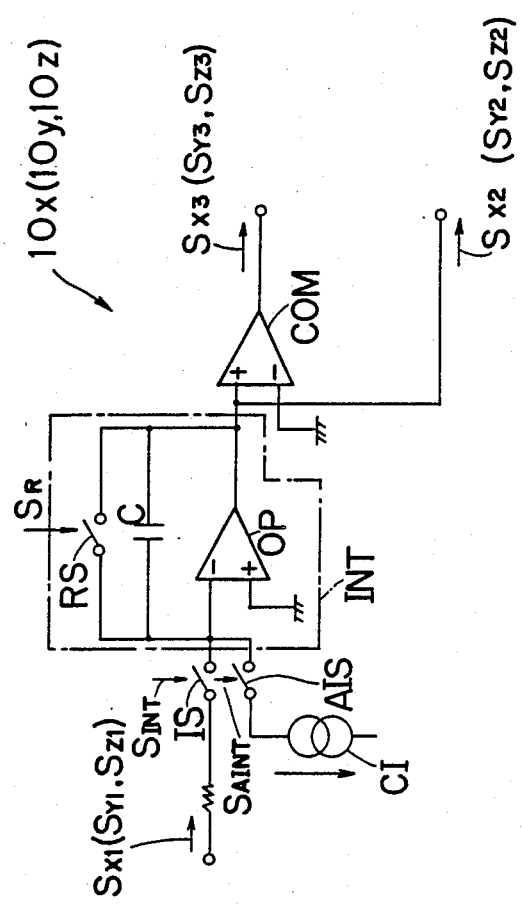
FIG. 2 is a circuit diagram of a double integration analog to digital converter of the spot colorimeter of FIG. 1.

The double integration analog to digital converters 10x, 10y, 10z have a similar construction as shown in FIG. 2.

In particular, each of the double integration analog to digital converters 10x, 10y, 10z includes an integrating circuit INT, a comparator COM having a noninverting input terminal (+) connected to an output terminal of the integrating circuit INT, an integration switch IS for delivering an input signal $S_{X1}$ ($S_{Y1}$, $S_{Z1}$) to the integrating circuit INT to cause the latter to start an integrating operation, an inverse integration switch AIS for causing the integrating circuit INT to start an inverse integrating operation, and a constant-current circuit CI connected to the inverse integration switch AIS.

The integrating circuit INT includes an operational amplifier OP, an integrating capacitor C connected between an inverting input terminal (−) and an output terminal of the operational amplifier OP, and a reset switch RS connected in parallel to the integrating capacitor C.

Thus, signals $S_{X3}$, $S_{Y3}$, $S_{Z3}$ are delivered from output terminals of the comparators COM of the analog to digital converters 10x, 10y, 10z to the counters 11x, 11y, 11z, respectively.

The CPU 12 thus executes following operations in a sequential cyclical manner:

(1) to deliver a reset signal $S_R$ to all of the reset switches RS of the analog to digital converters 10x, 10y, 10z at a time just when analog to digital conversion is completed on all of the analog to digital converters 10x, 10y, 10z;

(2) after lapse of a predetermined interval of time after starting of delivery of the reset signal $S_R$, to stop delivery of the reset signal $S_R$ and deliver an integration signal $S_{INT}$ to all of the integration switches IS;

(3) after lapse of another predetermined interval of time after starting of delivery of the integration signal $S_{INT}$, to stop delivery of the integration signal $S_{INT}$, deliver an inverse integration signal $S_{AINT}$ to all of the inverse integration switches AIS and deliver a counting start signal $S_{ST}$ to all of the counters 11x, 11y, 11z; and (4) at a time just when analog to digital conversion is completed on all of the analog to digital converters 10x, 10y, 10z, to read count values from the individual counters 11x, 11y, 11z.

Referring back to FIG. 1, the spot colorimeter further includes a Y peak over judging circuit 13y for judging whether or not a signal $S_{Y1}$ of a stimulus value Y from the photoelectric converter 9y is a greater than a predetermined value, and an XZ peak over judging circuit 13xz for judging whether or not signals $S_{X1}$, $S_{Z1}$ of stimulus values X, Z from the photoelectric converting circuits 9x, 9z are over a predetermined value. The Y peak over judging circuit 13y and the XZ peak over judging circuit 13xz effect such an over judging operation while the integration signal $S_{INT}$ from the CPU 12 is maintained at an "H" level.

Meanwhile, a Y integration over judging circuit 14y judges whether or not an integration output $S_{Y2}$ from the integrating circuit INT of the analog to digital converter 10y is greater than a predetermined value, and an XZ integration over judging circuit 14xz judges whether or not integration outputs $S_{X2}$, $S_{Z2}$ from the integrating circuits INT of the two analog to digital converting circuits 10x, 10z are greater than a predetermined value.

An OR gate $OR_1$ is connected to be rendered conductive by a peak over judgement signal $S_{POY}$ from the Y peak over judging circuit 13y or by an integration over judgment signal $S_{IOY}$ from the Y integration over judging circuit 14y to deliver an over judgment signal $S_{OY}$ to the CPU 12. Another OR gate $OR_2$ is connected to be rendered conductive by a peak over judgment signal $S_{POXZ}$ from the XZ peak over judging circuit 13xz or by an integration over judgement signal $S_{IOXZ}$ from the XZ integration over judging circuit 14xz to deliver an over judgment signal $S_{OXZ}$ to the CPU 12.

The spot colorimeter of FIG. 1 further includes a display device 15 and a light measuring switch 16 both connected to the CPU 12.

Figure 3:
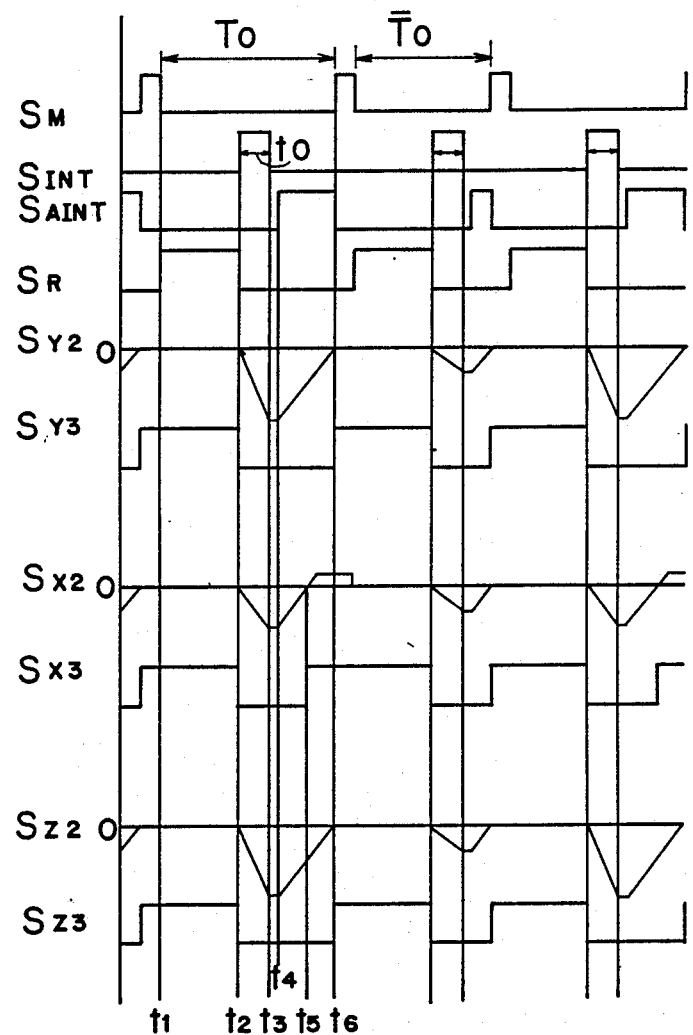
FIG. 3 is a time chart illustrating operation of the spot colorimeter of FIG. 1.

Now, operation of the spot colorimeter of the noncontact type described above will be described with reference to a time chart of FIG. 3.

Light from an object for measurement is introduced to the input end 2a of the branched optical fiber 2 by the objective lens 1. The incoming light is interrupted by a chopping operation of the chopper 4. In particular, a motor controlling signal $S_M$ is intermittently developed from the CPU 12, and the motor 5 is intermittently driven by the motor controller 6 in response to the motor controlling signal $S_M$. In FIG. 3, reference symbol $T_0$ represents a light measuring period (a period of time during which light to be measured is admitted), and $\overline{T}_0$ represents a light interrupting period.

The light incident to the input end 2a of the branched optical fiber 2 is divided by the three light transmission paths 2b, 2c, 2d into three components which are then introduced to and received by the light receiving elements 8x, 8y, 8z from the output ends 2x, 2y, 2z of the branched optical fiber 2 via the filters 7x, 7y, 7z, respectively.

Since the filter 7x and the light receiving element 8x specify the spectral sensitivity $\bar{x}_\lambda$, the light receiving element 8x receives light corresponding to the stimulus value X. Similarly, the light receiving element 8y receives light corresponding to the stimulus value Y, and the light receiving element 8z receives light corresponding to the stimulus value Z. In this instance, the light receiving elements 8x, 8y, 8z receive the light beams corresponding to the stimulus values X, Y, Z at the same time.

The light receiving element 8x generates electric current corresponding to the stimulus value X, and the current generated is converted into a voltage by the photoelectric converting circuit 9x. Consequently, a signal $S_{X1}$ regarding the stimulus value X is delivered from the photoelectric converting circuit 9x to the analog to digital converter 10x. Similarly, a signal $S_{Y1}$ regarding the stimulus value Y is delivered to the analog to digital converter 10y, and a signal $S_{Z1}$ regarding the stimulus value Z is delivered to the analog to digital converter 10z.

Within a period of time from $t_1$ to $t_2$, the CPU 12 delivers a reset signal $S_R$ to all of the analog to digital converters 10x, 10y, 10z. Within the period, there is no output of an integration signal $S_{INT}$ or an inverse integration signal $S_{AINT}$. In response to the reset signal $S_R$, the reset switches RS of the analog to digital converters 10x, 10y, 10z are turned on, and accordingly the charge accumulated in the integrating capacitors C of the analog to digital converters 10x, 10y, 10z is completely discharged therefrom.

Within a subsequent period of time from $t_2$ to $t_3$, the CPU 12 delivers an integration signal $S_{INT}$ to all of the analog to digital converters 10x, 10y, 10z. Within the period, there is no output of an inverse integration signal $S_{AINT}$ or a reset signal $S_R$. In response to the integration signal $S_{INT}$, the integration switches IS of the analog to digital converters 10x, 10y, 10z are turned on so that charging of the integrating capacitors C in the negative polarity is started at the same time in the analog to digital converters 10x, 10y, 10z in accordance with signals $S_{X1}$, $S_{Y1}$, $S_{Z1}$ from the photoelectric converting circuits 9x, 9y, 9z, respectively. Consequently, outputs $S_{X2}$, $S_{Y2}$, $S_{Z2}$ of the integrating circuits INT of the analog to digital converters 10x, 10y, 10z thereafter decrease linearly. Since the outputs $S_{X2}$, $S_{Y2}$, $S_{Z2}$ are lower than 0 volt, the comparators COM produce outputs $S_{X3}$, $S_{Y3}$, $S_{Z3}$ of the "L" level. In this instance, the integration time $t_0$ is the same with respect to all of the analog to digital converters 10x, 10y, 10z. Accordingly, if incident light is varying in time, the ratio of the tristimulus values X, Y, Z relative to one another will present no change.

At the time $t_3$, delivery of the integration signal $S_{INT}$ is stopped so that the integrating operation is stopped. Then, within a subsequent period of time from $t_3$ to $t_4$, all of the integration signal $S_{INT}$, the inverse integration signal $S_{AINT}$ and the reset signal $S_R$ are turned into the "L" level. Further within the period from $t_3$ to $t_4$, the CPU 12 controls to operate the Y peak over judging circuit 13y, Y integration over judging circuit 14y, XZ peak over judging circuit 13xz and XZ integration over judging circuit 14xz to perform respective over judging operations.

If the Y peak over judging circuit 13y judges that a signal $S_{Y1}$ of a stimulus value Y from the photoelectric converting circuit 9y is greater than a predetermined value, a peak over judgment signal is delivered therefrom and renders the OR gate $OR_1$ conductive so that an over judgment signal $S_{OY}$ is delivered from the OR gate $OR_1$ to the CPU 12. As a result, the CPU 12 delivers a range change-over signal $S_{RC1}$ to the photoelectric converting circuit 9y in order to change over the range of the photoelectric converting circuit 9y so that the level of the signal $S_{Y1}$ from the photoelectric converting circuit 9y may be within an appropriate range. Meanwhile, when the Y integration over judging circuit 14y makes an "over" judgment, an integration over judgment signal $S_{IOY}$ renders the OR gate $OR_1$ conductive, and consequently the range of the photoelectric converting circuit 9y is changed over in a similar manner to that described above.

On the other hand, if the XZ peak over judging circuit 13xz makes an "over" judgment, a peak over judgment signal $S_{POXZ}$ renders the OR gate $OR_2$ conductive so that an over judgment signal $S_{OXZ}$ is delivered from the OR gate $OR_2$ to the CPU 12. Consequently, the CPU 12 delivers a range change-over signal $S_{RC2}$ to the photoelectric converting circuits 9x, 9z in order to change over the range of the photoelectric converting circuits 9x, 9z so that the level of signals $S_{X1}$, $S_{Z1}$ from the photoelectric converting circuits 9x, 9z may be within an appropriate range. Meanwhile, when the XZ integration over judging circuit 14xz makes an "over" judgment, an integration over judgment signals $S_{IOXZ}$ renders the OR gate $OR_2$ conductive, and consequently the range of the photoelectric converting circuits 9x, 9z are changed over in a similar to that described above.

In this manner, when there is an "over" judgment, the current range is changed over to another whereafter analog to digital conversion is resumed.

On the contrary, when there is no "over" judgment, the CPU 12 delivers, at the time $t_4$, an inverse integration signal $S_{AINT}$ to the inverse integration switches AIS of the analog to digital converters 10x, 10y, 10z and delivers a counting start signal $S_{ST}$ to the counters 11x, 11y, 11z. In response to the inverse integration signal $S_{AINT}$, the inverse integration switches AIS are turned on so that the charge accumulated in the integrating capacitors C of the analog to digital converters 10x, 10y, 10z is discharged via the respective constant-current circuits CI. In other words, charging of the integrating capacitors C in the positive polarity is started at the same time in the analog to digital converters 10x, 10y, 10z as their individual inverse integrating operations.

Consequently, the outputs $S_{X2}$, $S_{Y2}$, $S_{Z2}$ of the integrating circuits INT of the analog to digital converters 10x, 10y, 10z thereafter increase linearly. However, since the outputs $S_{X2}$, $S_{Y2}$, $S_{Z2}$ of the integrating circuits INT still remain lower than 0 volt, the outputs $S_{X3}$, $S_{Y3}$, $S_{Z3}$ of the comparators COM of the analog to digital converters 10x, 10y, 10z maintain the "L" level.

Meanwhile, the counters 11x, 11y, 11z start their counting operations in response to the counting start signal $S_{ST}$. Such counting operations of the counters 11x, 11y, 11z are allowed only while the outputs $S_{X3}$, $S_{Y3}$, $S_{Z3}$ of the comparators COM of the analog to digital converters 10x, 10y, 10z remain at the "L" level.

As a result of the inverse integration operation, the outputs $S_{X2}$, $S_{Y2}$, $S_{Z2}$ of the integrating circuits INT will finally reach 0 volt, but such points of time when 0 volt is reached will vary depending upon magnitudes of the outputs $S_{X2}$, $S_{Y2}$, $S_{Z2}$ of the integrating circuits INT of the analog to digital converters 10x, 10y, 10z. Anyway, however, when the output $S_{X2}$, $S_{Y2}$ or $S_{Z2}$ of any of the integrating circuits INT of the analog to digital converters 10x, 10y, 10z reaches 0 volt, the output of the comparator COM of the analog to digital converter 10x, 10y or 10z is changed over to the "H" level. Thus, at a point of time when the outputs of the comparators COM of all of the analog to digital converters 10x, 10y, 10z are changed into the "H" level, the AND gate $AND_1$ is rendered conductive to deliver an analog to digital conversion completion signal $S_{END}$ to the CPU 12. Meanwhile, each of the counters 11x, 11y, 11z ends its counting operation at a time when the output signal $S_{X3}$, $S_{Y3}$, $S_{Z3}$ of the comparator COM of the associated analog to digital converter 10x, 10y, 10z is changed into the "H" level.

The CPU 12 stops delivery of the inverse integration signal $S_{SAINT}$ at a point of time $t_6$ when the outputs of all of the comparators COM are finally changed into the "H" level. Also at the time $t_6$, count values of the counters 11x, 11y, 11z are read into the CPU 12.

Thus, one cycle of the light measuring period $T_0$ is completed.

The count values of the counters 11x, 11y, 11z represent numbers of clock signals as counted while the associated comparators COM are in the "L" level condition, and correspond to magnitudes of the input signals $S_{X1}$, $S_{Y1}$, $S_{Z1}$ to the analog to digital converters 10x, 10y, 10z, respectively.

Within a subsequent light interrupting period $\overline{T_0}$, introduction of incident light from the object for measurement is interrupted by the chopper 4. In order to correct an error caused by an offset of the circuitry, measurement must be performed also within the light interrupting period $\overline{T_0}$. Operation for such measurement is similar to that within the light measuring period $T_0$.

It is to be noted that where there is no possiblility of an error to be caused by an offset of the circuitry, measurement within the light interrupting period $\overline{T_0}$ may be omitted.

Figure 4:
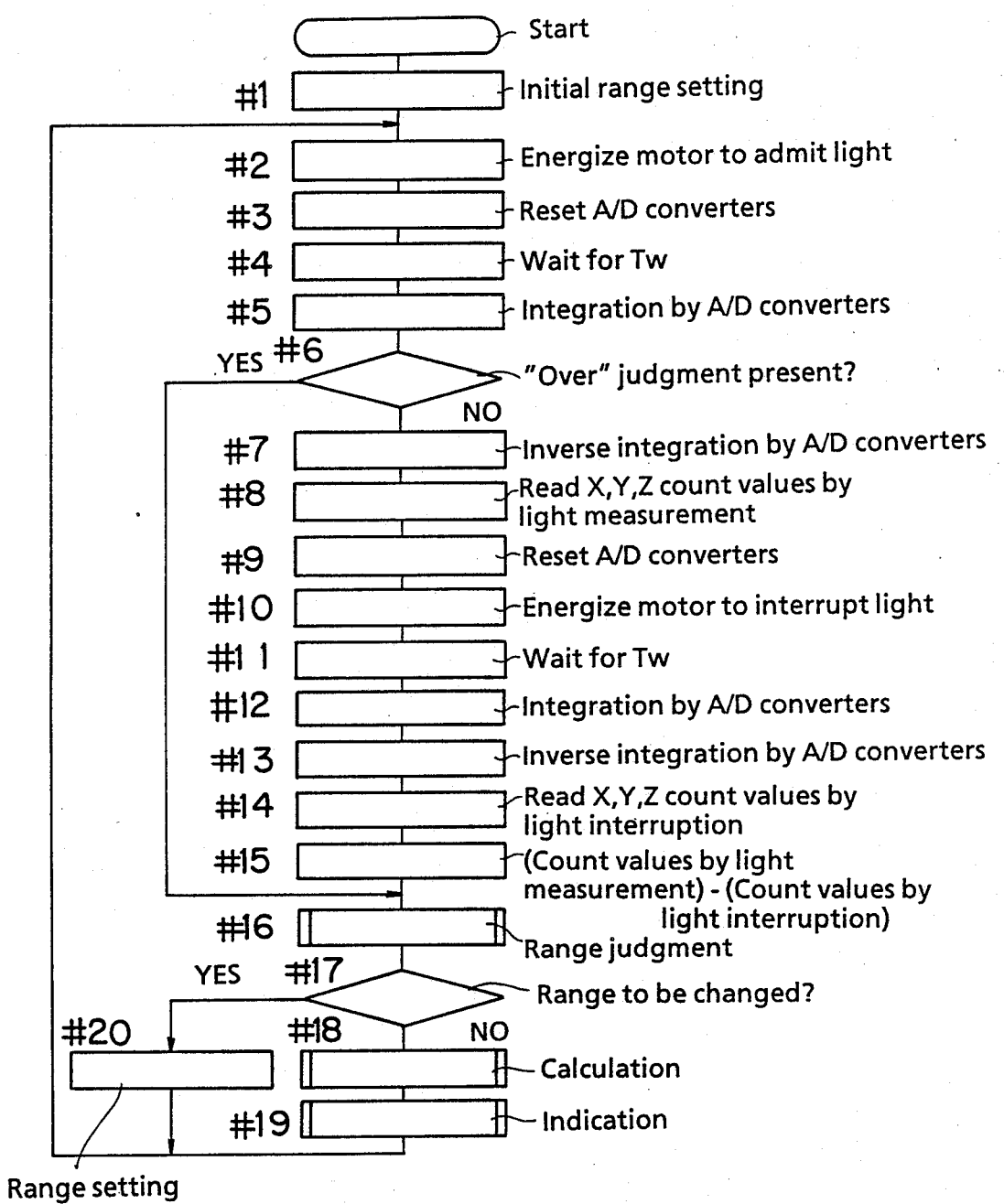
FIG. 4 is a flow chart illustrating operation of the spot colorimeter of FIG. 1.

Now, operation of the CPU 12 which manages such operations as described above will be described in detail with reference to a flow chart of FIG. 4.

When the light measuring switch 16 is turned on, operation of the CPU 12 starts from step #1. At step #1, a range for the photoelectric converting circuits 9x, 9y, 9z is initially set. Then at step #2, a motor controlling signal $S_M$ is delivered from the CPU 12 to the motor controlling circuit 6 to activate the motor 5 to move the chopper 4 to an open position. At step #3, a reset signal $S_R$ is delivered to the reset switches RS of the analog to digital converters $10x$, $10y$, $10z$. Then at step #4, the CPU 12 waits for a predetermined interval of time Tw. Subsequently at step #5, an integration signal $S_{INT}$ is delivered to all of the analog to digital converters $10x$, $10y$, $10z$ in order for them to execute individual integrating operations. At step #6, the CPU 12 checks results of judgments at the Y peak over judging circuit $13y$, Y integration over judging circuit $14y$, XZ peak over judging circuit $13xz$ and XZ integration over judging circuit $14xz$. In case the CPU 12 finds out that there is no "over" judgment, the program advances to step #7 at which the CPU 12 delivers an inverse integration signal $S_{AINT}$ to the analog to digital converters $10x$, $10y$, $10z$ to cause the latter to perform individual inverse integrating operations. At step #8, the CPU 12 reads count values of the counters $11x$, $11y$, $11z$. Then at step #9, another motor controlling signal $S_M$ is delivered to rotate the motor 5 in the reverse direction to move the chopper 4 to a closed position. At step #10, a reset signal $S_R$ is delivered again to the analog to digital converters $10x$, $10y$, $10z$ to cause the individual integrating capacitors C to discharge. At step #11, the CPU 12 waits for the predetermined interval of time Tw again. At step #12, integrating operations are executed again but in the light interrupting condition, and then at step #13, inverse integrating operations are executed again. At step #14, the CPU 12 reads count values of the counters $11x$, $11y$, $11z$. Then at step #15, the count values just read in for the light interrupting period $\overline{T_0}$ are subtracted in the CPU 12 from the corresponding count values precedently read in for the light measuring period $T_0$ to effect correction of the individual zero points. Subsequently, the program advances to step #16.

To the contrary, in case there is an "over" judgment at step #6, the program jumps from step #6 to step #16.

At step #16, operation of a range judging subroutine is executed, and then at step #17, the CPU 12 determines whether or not the range should be changed over. In case there is no necessity of changing over the range, the program advances to step #18 at which operation of a subroutine for calculations of a luminance Y and chromaticities x, z is executed and then to step #19 at which results of such calculations are displayed on the display device 15, whereafter the program returns to step #2.

Meanwhile, in case it is determined at step #17 that the range should be changed over, the program advances to step #20 at which operation of a subroutine for setting of a range is executed, whereafter the program returns to step #2.

According to the present embodiment described above, following effects are exhibited.

Since a branched optical fiber having a plurality of independent light transmission paths from an input end to a plurality of output ends is employed, there is no bad optical influence from therearound and accordingly an appearance of an error in stimulus value of any light receiving element can be eliminated. Besides, since light is introduced at the same time to the light receiving elements by the branched optical fiber and analog to digital conversion of outputs of the light receiving elements is performed at the same time, even if incident light varies in time, measurement can be attained with high accuracy while the ratio of light components relative to one another is maintained constant.

Further, by employment of a branched optical fiber, the structure for dividing incident light can be simplified and the degree of freedom in arrangement of light receiving elements can be enhanced.

Besides, when the amount of light which can be actually used for intended measurement is small such as when light from an object for measurement having a very small area is to be measured, employment of a branched optical fiber will allow such a small amount of available light to be introduced to light receiving means with high efficiency so that measurement can be effected for a plurality of wavelengths of light at a time with high accuracy. In addition, since analog electric signals obtained by such measurement are then converted into digital signals at a time by analog to digital converting means, possible deterioration in accuracy of measurement which may be caused by a change of a light source in time, a leak of values stored in memory or a dislocation of a small area of an object for measurement can be prevented.

Now, a second embodiment of the invention will be described in detail. At first, fundamental operation of a photoelectric colorimeter according to the second embodiment will be described.

In the photoelectric colorimeter of the second embodiment, at first gains of amplifiers of the variable gain type for individually amplifying outputs of three light receiving elements for measurement of tristimulus values are set to an allowable lowermost level. In this condition, outputs of the light receiving elements are amplified by the variable gain type amplifiers. Here, it is assumed that N is a count value corresponding to an amplified digital value converted from an analog output, for example, of one of the three light receiving elements for the tristimulus values, Nmin a minimum count value necessary to maintain a predetermined calculation accuracy, and Nmax a maximum count value which does not cause saturation of the circuitry. Thus, it is determined whether the count value N is greater than Nmax or smaller than Nmin. Then, if the count value N is between Nmax and Nmin, then measurement will thereafter be performed without changing over the current gains of the variable gain type amplifiers.

To the contrary, if the count value N is greater than Nmax in an initially set condition wherein the gains of the variable gain type amplifiers are set to the allowable lowermost level, an indication for warning is made because the gain can no more be lowered. Also in any of following cycles of measurement, each time it is determined that the gain cannot be lowered any more, such an indication for warning is made.

Meanwhile, in case the count value N is smaller than Nmin in the initially set condition described above, it is determined whether the count value N is greater than Nmin/10 or greater than Nmin/100 or else smaller than Nmin/100. In case the count value N is greater than Nmin/10, the gain of the variable gain type amplifiers is raised by ten times, but in case the count value N is greater than Nmin/100, the gain of the variable gain type amplifiers is raised by 100 times, and in case the count value N is otherwise smaller than Nmin/100, the gain of the variable gain type amplifiers is raised by 1000 times before measurement is performed again. In case the count value N is smaller than Nmin even if the gain is raised by 1000 times that of the initially set condition, an indication for warning is made.

Also in any of following cycles of measurement, if the count value N obtained by measurement with the gain of the amplifiers set to its maximum level is smaller than Nmin, an indication for warning is made. Such an operation is made with respect to each of the tristimulus values. However, of the stimulus value X and the stimulus value Z, only a larger one is used.

Figure 5:
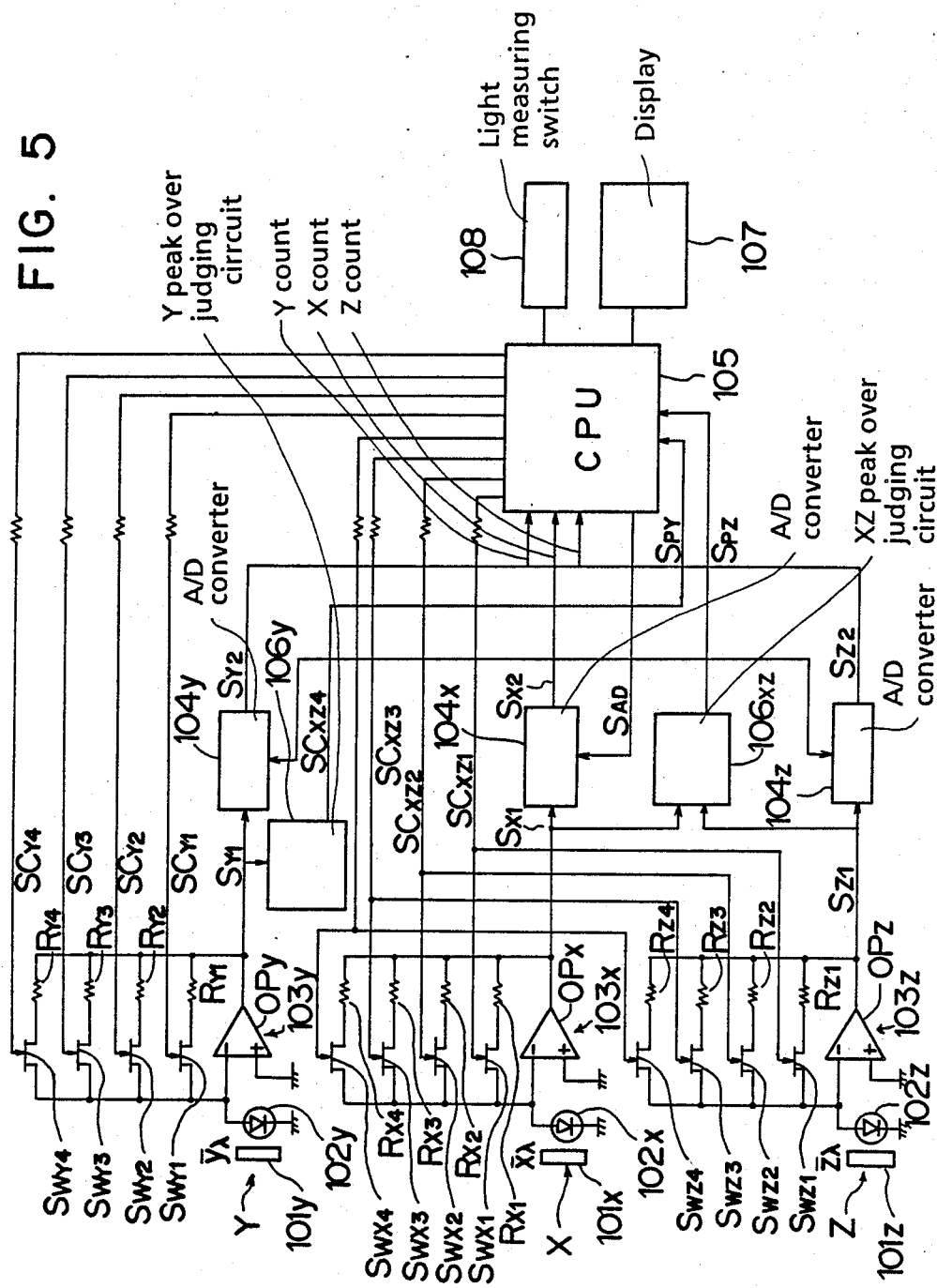
FIG. 5 is a block circuit diagram of a photoelectric colorimeter illustrating a second embodiment of the invention.

Now, the second embodiment which fundamentally operates in such a manner as described above will be described in detail at first with reference to a block circuit diagram of FIG. 5.

The photoelectric colorimeter of the second embodiment shown includes filters $101x$, $101y$, $101z$ having different transmission wavelengths, and light receiving elements $102x$, $102y$, $102z$ such as SPDs (silicon photodiodes) located in an opposing relationship to the filters $101x$, $101y$, $101z$, respectively. The spectral sensitivity $\bar{x}_\lambda$ is specified by characteristics of the filter $101x$ and the light receiving element $102x$, the spectral sensitivity $\bar{y}_\lambda$ by characteristics of the filter $101y$ and the light receiving element $102y$, and the spectral sensitivity $\bar{z}_\lambda$ by characteristics of the filter $101z$ and the light receiving element $102z$.

The photoelectric colorimeter further includes amplifiers $103x$, $103y$, $103z$ of the variable gain type each constituted from an I-V converting circuit for linearly converting electric current generated by the light receiving element $102x$, $102y$, $102z$, respectively, into a corresponding voltage.

The variable gain type amplifier $103x$ for the stimulus value X includes an operational amplifier OPx and four feedback circuits connected in parallel to each other between an inverting input terminal (−) and an output terminal of the operational amplifier OPx. The first one of the feedback circuits consists of a series circuit of a feedback resistor $R_{X1}$ and a feedback resistor change-over switch $Sw_{X1}$; the second feedback circuit consists of a series circuit of a feedback resistor $R_{X2}$ and a feedback resistor change-over switch $Sw_{X2}$; the third feedback circuit consists of a series circuit of a feedback resistor $R_{X3}$ and a feedback resistor change-over switch $Sw_{X3}$; and the fourth feedback circuit consists of a series circuit of a feedback resistor $R_{X4}$ and a feedback resistor change-over switch $Sw_{X4}$.

The variable gain type amplifier $103y$ for the stimulus value Y includes an operational amplifier OPy and four feedback circuits connected in parallel to each other between an inverting input terminal (−) and an output terminal of the operational amplifier OPy. The first feedback circuit consists of a series circuit of a feedback resistor $R_{Y1}$ and a switch $Sw_{Y1}$; the second feedback circuit consists of a series circuit of a feedback resistor $R_{Y2}$ and a switch $Sw_{Y2}$; the third feedback circuit consists of a series circuit of a feedback resistor $R_{Y3}$ and a switch $Sw_{Y3}$; and the fourth feedback circuit consists of a series circuit of a feedback resistor $R_{Y4}$ and a switch $Sw_{Y4}$.

The variable gain type amplifier $103z$ for the stimulus value Z includes an operational amplifier OPz and four feedback circuits connected in parallel to each other between an inverting input terminal (−) and an output terminal of the operational amplifier OPz. The first feedback circuit consists of a series circuit of a feedback resistor $R_{Z1}$ and a switch $Sw_{Z1}$; the second feedback circuit consists of a series circuit of a feedback resistor $R_{Z2}$ and a switch $Sw_{Z2}$; the third feedback circuit consists of a series circuit of a feedback resistor $R_{Z3}$ and a switch $Sw_{Z3}$; and the fourth feedback circuit consists of a series circuit of a feedback resistor $R_{Z4}$ and a switch $Sw_{Z4}$.

Resistances of the feedback resistors have such a relationship as represented by a following equation:

$$R_{X1} : R_{X2} : R_{X3} : R_{X4} =$$
$$R_{Y1} : R_{Y2} : R_{Y3} : R_{Y4} =$$
$$R_{Z1} : R_{Z2} : R_{Z3} : R_{Z4} =$$
$$1 : 10 : 100 : 1000$$

The four switches $Sw_{Y1}$, $Sw_{Y2}$, $Sw_{Y3}$, $Sw_{Y4}$ of the variable gain type amplifier $103y$ for the stimulus value Y are turned on when switching control signals $SC_{Y1}$, $SC_{Y2}$, $SC_{Y3}$, $SC_{Y4}$ from a CPU 105 are changed to an "H" level, respectively.

The first switches $Sw_{X1}$, $Sw_{Z1}$ of the variable gain type amplifiers $103x$, $103z$ for the stimulus values X, Z, respectively, are turned on when a switching control signal $SC_{XZ1}$ from the CPU 105 is changed to an "H" level; the second switches $Sw_{X2}$, $Sw_{Z2}$ are turned on when a switching control signal $SC_{XZ2}$ is changed to an "H" level; the third switches $Sw_{X3}$, $Sw_{Z3}$ are turned on when a switching control signal $SC_{XZ3}$ is changed to an "H" level; and the fourth switches $Sw_{X4}$, $Sw_{Z4}$ are turned on when a switching control signal $SC_{XZ4}$ is changed to an "H" level.

Thus, control of the gain of the variable gain type amplifier $103y$ for the stimulus value Y is effected independently of control of the gain of the variable gain type amplifier $103x$ for the stimulus value X and the gain of the variable gain type amplifier $103z$ for the stimulus value Z while gain control of the variable gain type amplifier $103x$ for the stimulus value X and gain control of the variable gain type amplifier $103z$ for the stimulus value Z are effected simultaneously with the same level.

The photoelectric colorimeter further includes three double integration analog to digital converters $104x$, $104y$, $104z$ for converting signals $S_{X1}$, $S_{Y1}$, $S_{Z1}$ for the stimulus values received from the variable gain type amplifiers $103x$, $103y$, $103z$ from analog values into digital values, respectively. The double integration analog to digital converters $104x$, $104y$, $104z$ perform analog to digital conversion at the same time in response to a control signal $S_{AD}$ from the CPU 105.

Output signals $S_{X2}$, $S_{Y2}$, $S_{Z2}$ of the analog to digital converters $104x$, $104y$, $104z$ are coupled as respective count values to the CPU 105.

The photoelectric colorimeter further includes a Y peak over judging circuit $106y$ for judging whether or not a signal $S_{Y1}$ for the stimulus value Y from the variable gain type amplifier $103y$ is greater than a predetermined value which is determined as a maximum value at which the linearity of the variable gain type amplifier $103y$ can be maintained in a good condition, and an XZ peak over judging circuit $106xz$ for judging whether or not signals $S_{X1}$, $S_{Z1}$ for the stimulus values X, Z from the variable gain type amplifiers $103x$, $103z$ are greater than a predetermined value which is determined as a maximum value at which the linearity of the variable gain type amplifiers $103x$, $103z$ can be maintained in a good condition. The Y peak over judging circuit $106y$ delivers a peak over judgment signal $S_{PY}$ to the CPU 105 when it finds out such a "peak over". Meanwhile, when the XZ peak over judging circuit $13xz$ finds out such a "peak over", it delivers a peak over judgment signal $S_{PXZ}$ to the CPU 105.

The photoelectric colorimeter further includes a display device 107 and a light measuring switch 108 both connected to the CPU 105.

Now, operation of the photoelectric colorimeter will be described with reference to a flow chart of FIG. 6.

When a power source is thrown in and the light measuring switch 108 is turned on, operation of the photoelectric colorimeter starts from step #101. At step #101, ranges for the variable gain type amplifiers 103x, 103y, 103z are initially set. In particular, only switching control signals $SC_{XZ1}$, $SC_{Y1}$ of the "H" level are delivered from the CPU 105 so that the gains of the variable gain type amplifiers 103x, 103y, 103z may be minimized. Consequently, the switches $Sw_{X1}$, $Sw_{Y1}$, $Sw_{Z1}$ are turned on while all the other switches are turned off.

Then at step #102, operation of a light measuring subroutine is executed. In particular, incident light from an object for measurement is introduced to the light receiving elements 102x, 102y, 102z via the filters 101x, 101y, 101z, respectively. Since the filter 101x and the light receiving element 102x specify the spectral sensitivity $\bar{x}_\lambda$ for the stimulus value X, light corresponding to the stimulus value X is received by the light receiving element 102x. Similarly, light corresponding to the stimulus value Y is received by the light receiving element 102y, and light corresponding to the stimulus value Z is received by the light receiving element 102z. In this instance, the light receiving elements 102x, 102y, 102z receive light corresponding to the stimulus values X, Y, Z at the same time. The light receiving element 102x generates electric current corresponding to the stimulus value X, and the electric current thus generated is converted into a voltage by the variable gain type amplifier 103x so that a signal $S_{X1}$ regarding the stimulus value X is delivered to the analog to digital converter 104x. Similarly, a signal $S_{Y1}$ regarding the stimulus value Y is delivered to the analog to digital converter 104y, and a signal $S_{Z1}$ regarding the stimulus value Z is delivered to the analog to digital converter 104z. Thus, the analog to digital converters 104x, 104y, 104z convert the signals $S_{X1}$, $S_{Y1}$, $S_{Z1}$ thus received from analog values into digital count values and deliver the digital count values as outputs therefrom.

Subsequently at step #103, such count values of the analog to digital converters 104x, 104y, 104z are read into the CPU 105. At step #104, the CPU 105 checks the Y peak over judging circuit 106y and determines whether there is a "peak over" in the signal $S_{Y1}$ from the variable gain type amplifier 103y. Thus, in case there is no "peak over" in the signal $S_{Y1}$ and accordingly the CPU 105 receives no peak over judgment signal $S_{PY}$ from the Y peak over judging circuit 106y, the program advances to step #105. At step #105, the CPU 105 determines from the signal $S_{Y2}$ received from the analog to digital converting circuit 104y whether or not the count value for the stimulus value Y is greater than a predetermined value. In case the determination is in the negative, the program advances to step #106 at which the CPU 105 determines from the signal $S_{Y2}$ whether or not the count value for the stimulus value Y has sufficient figures for necessary calculation. In case it is determined that the count value for the stimulus Y is within an appropriate range, the program advances to step #110.

To the contrary, in case the count value for the stimulus value Y does not have a sufficient magnitude depending upon characteristics of the light source, the program advances to step #107 at which operation of a down range number judging subroutine is executed. In the subroutine, a number of ranges to be shifted down is determined. Shifting down of a range corresponds to raising of a gain. Subsequently at step #108, the number of ranges to be shifted down for the stimulus value Y is stored, and then the program advances to step #110.

At step #110, the CPU 105 determines whether or not there is a "peak over" at the XZ peak over judging circuit 106xz. Thus, in case there is no "peak over" and accordingly a peak over judgment signal $S_{PXZ}$ from the XZ peak over judging circuit 106xz is not received by the CPU 105, the program advances to step #111. At step #111, the CPU 105 compares the X count value as represented by the signal $S_{X2}$ received from the analog to digital converter 104x with the Z count value as represented by the signal $S_{Z2}$ received from the analog to digital converter 104z to determine which is greater, and a greater one of the X and Z count values is stored in memory as a G count value. Then at step #112, it is determined whether or not the G count value is greater than a predetermined value. In case the determination is in the negative, the program advances to step #113 at which it is determined whether or not the G count value Y has sufficient figures for necessary calculation. In case it is determined that the G count value is within an appropriate range, the program advances to step #117.

To the contrary, in case the G count value does not have a sufficient magnitude depending upon characteristics of the light source, the program advances to step #114 at which operation of the down range number judging subroutine is executed in order to determine what number of ranges is to be shifted down. Then at step #115, the number of ranges to be shifted down for the stimulus values X and Z is stored in memory, and then the program advances to step #117.

At step #117, it is determined whether the current range is to be changed or not. In case there is no necessity of changing the range or in case it is impossible to change the range, the program advances to step #118 at which operation of a subroutine for calculations of a luminance Y and chromaticities x, z is executed and then to step #119 at which results of the calculations are displayed on the display device 107, whereafter the program returns to step #102. On the contrary in case it is determined at step #117 that it is necessary and possible to change the range, the program advances to step #120 in order to change the range.

Figure 6:
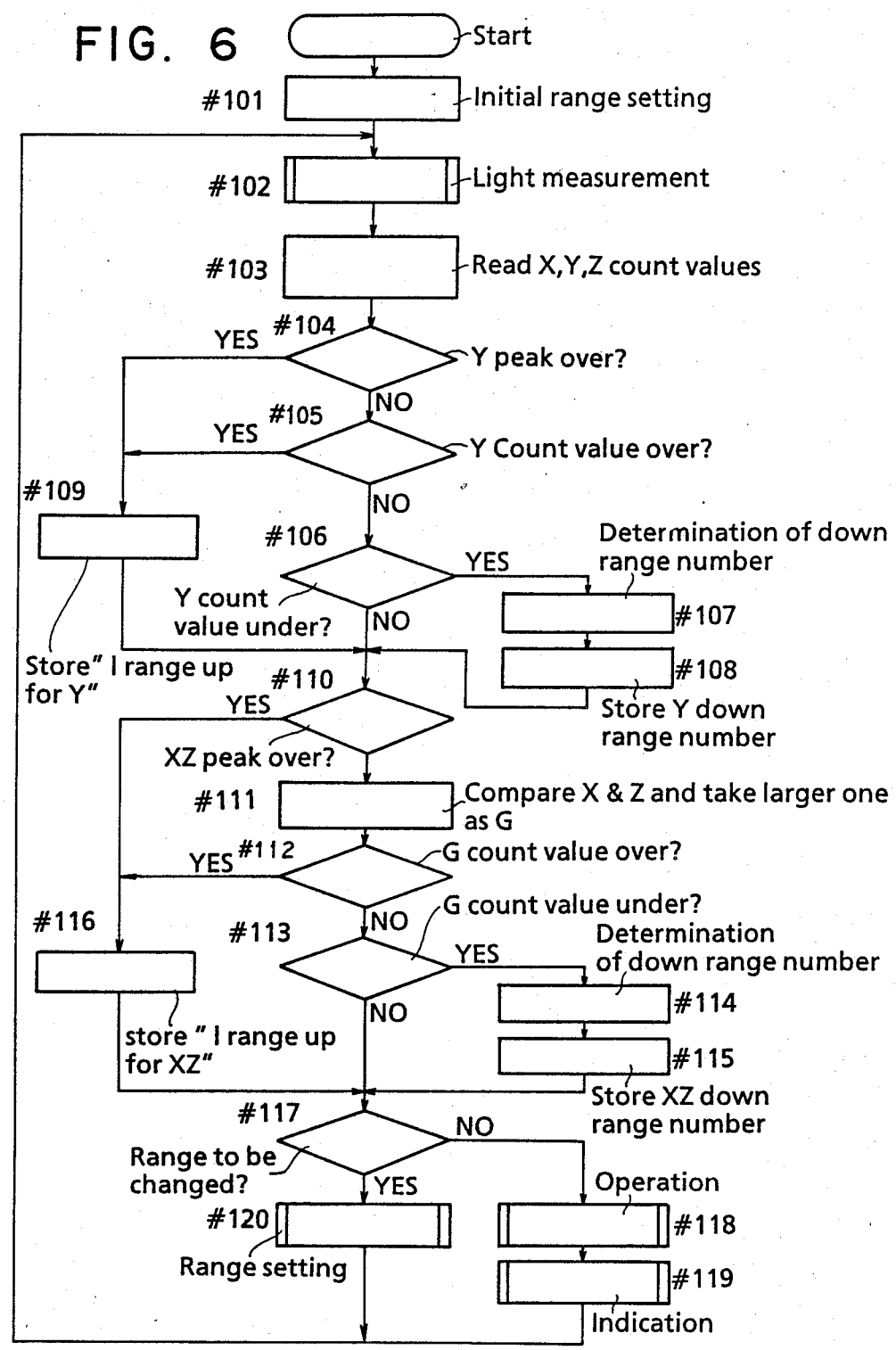
FIG. 6 is a flow chart illustrating operation of the photoelectric colorimeter of FIG. 5.

In the measuring cycle shown in FIG. 6, determination at step #104 may be sometimes "YES". This is when a signal $S_{PY}$ is delivered from the Y peak over judging circuit 106y, that is, when the output signal $S_{Y1}$ of the variable gain type amplifier 103y exceeds a maximum value which does not cause saturation of the variable gain type amplifier 103y. In this instance, the program advances to step #109 at which, since it is necessary to shift up the range of the variable gain type amplifier 103y by one to lower the gain of the amplifier 103y to one tenth, this is stored in the CPU 105. Here, since in the initially set condition the switching control signal $SC_{Y1}$ is at the "H" level and the switch $Sw_{Y1}$ is on and accordingly the gain of the variable gain type amplifier 103y is at its minimum value, it is impossible to lower the gain of the variable gain type amplifier 103y any more. Thus, when it is impossible to change the gain any more to cope with the situation in this manner, the program advances from step #117 to step #118 and then to step #119 in order to make an indication for warning not shown.

Further, it may sometimes occur that it is determined "YES" at step #105. This is when the current gain of the variable gain type amplifier 103y is too high to maintain the good linearity in analog to digital conversion, which represents that the count value N described hereinabove exceeds Nmax. Accordingly, in this instance, the range of the variable gain type amplifier 103y must necessarily be shifted by one to lower its gain to one tenth. To this end, it is stored in memory at step #109 that it is necessary to shift the range of the variable gain type amplifier 103y by one to lower its gain to one tenth. Also here, since in the initially set condition the switching control signal $SC_{Y1}$ is at the "H" level and the switch $Sw_{Y1}$ is on and accordingly the gain of the variable gain type amplifier 103y is at its minimum level, it is impossible to further lower the gain of the variable gain type amplifier 103y. Accordingly, also when it is impossible to change the gain any more to cope with the situation in this manner, an indication for warning not shown is made as described hereinabove.

Meanwhile, it may likely occur that it is determined "YES" at step #106. This is when the current gain of the variable gain type amplifier 103y is too low to maintain the good linearity in analog to digital conversion, which indicates that the count value N described hereinabove is smaller than Nmin. Accordingly, in this instance, it is judged at step #107 whether the count value N is greater than Nmin/10 or greater than Nmin/100 or else smaller than Nmin/100 as described hereinabove. Then at step #108, in case the count value N is determined greater than Nmin/10 at step #107, it is stored in memory that it is necessary to raise the range of the variable gain type amplifier 103y by one to raise the gain of the variable gain type amplifier 103y to 10 times the minimum value, but otherwise in case the count value N is determined greater than Nmin/100 at step #107, it is stored in memory that it is necessary to raise the range of the variable gain type amplifier 103y by two to raise the gain of the variable gain type amplifier 103y to 100 times the minimum value, or else in case the count value N is determined smaller than Nmin/100 at step #107, it is stored in memory that it is necessary to raise the range of the variable gain type amplifier 103y by three to raise the gain of the variable gain type amplifier 103y to 1000 times the minimum value.

Since here in the initially set condition the switching control signal $SC_{Y1}$ is at the "H" level and the switch $Sw_{Y1}$ is on, if the count value N is greater than Nmin/10, the switching control signal $SC_{Y2}$ is changed to the "H" level in place of the switching control signal $SC_{Y1}$ to turn the switch $Sw_{Y2}$ on so that the gain of the variable gain type amplifier 103y may become 10 times the minimum level. Otherwise when the count value N is greater than Nmin/100, the switching control signal $SC_{Y3}$ is changed to the "H" level in place of the switching control signal $SC_{Y1}$ to turn the switch $Sw_{Y3}$ on so that the gain of the variable gain type amplifier 103y may become 100 times the minimum level. Or else, when the count value N is smaller than Nmin/100, the switching control signal $SC_{Y4}$ is changed to the "H" level in place of the switching control signal $SC_{Y1}$ to turn the switch $Sw_{Y4}$ on so that the gain of the variable gain type amplifier 103y may become 1000 times the minimum level. But in case the count value N obtained by measurement with the gain of the variable gain type amplifier 103y raised to 1000 times the minimum level is still smaller than Nmin, an indication for warning is made. However, it is to be noted that where such a change-over of the range as described above is necessary and possible, actual change-over is executed at step #120 after determination at step #117. At step #120, a range after such change-over is stored in memory.

On the other hand, with respect to the stimulus values X and Z, determination may be "YES" at step #110 or #112 of the flow chart of FIG. 6. In this instance, similar operations to those of the steps #104 and #105 for the stimulus value Y may be executed for the stimulus values X and Z.

In particular, when the range of the variable gain type amplifier 103y for the stimulus value Y is to be lowered to raise its gain, a switching control signal of the "H" level is delivered to only one of the four switches $Sw_{Y1}$, $Sw_{Y2}$, $Sw_{Y3}$, $Sw_{Y4}$ corresponding to the gain to be obtained. Meanwhile, when the ranges of the variable gain type amplifier 103x for the stimulus value X and the variable gain type amplifier 103z for the stimulus value Z are to be lowered to raise their gains, a switching control signal of the "H" level is delivered to only one of the four switches $Sw_{X1}$ to $Sw_{X4}$ and only one of the four switches $Sw_{Z1}$ to $Sw_{Z4}$ corresponding to the gains to be obtained. In this instance, gain up control of the variable gain type amplifier 103x for the stimulus value X and gain up control of the variable gain type amplifier 103z for the stimulus value Z are executed simultaneously with the same level. However, gain up control of the variable gain type amplifier 103y for the stimulus value Y is executed independently of gain up control of the variable gain type amplifiers 103x, 103z.

On the contrary, when the range of the variable gain type amplifier 103y for the stimulus value Y is to be raised to lower its gain, a switching control signal of the "H" level is delivered to only one of the four switches $Sw_{Y1}$, $Sw_{Y2}$, $Sw_{Y3}$, $Sw_{Y4}$ corresponding to the gain to be obtained. Meanwhile, when the ranges of the variable gain type amplifier 103x for the stimulus value X and the variable gain type amplifier 103z for the stimulus value Z are to be raised to lower their gains, a switching control signal of the "H" level is delivered to only one of the four switches $Sw_{X1}$ to $Sw_{X4}$ and only one of the four switches $Sw_{Z1}$ to $Sw_{Z4}$ corresponding to the gains to be obtained. In this instance, gain down control of the variable gain type amplifier 103x for the stimulus value X and gain down control of the variable gain type amplifier 103z for the stimulus value Z are executed simultaneously with the same level. In addition, gain down control of the variable gain type amplifier 103y for the stimulus value Y is executed independently of gain down control of the variable gain type amplifiers 103x, 103z. It is to be noted that, in the case of gain down control, the gain is lowered one by one step.

Now, a photoelectric colorimeter of a third embodiment of the invention will be described with reference to a block circuit diagram of FIG. 7. While in the second embodiment shown in FIG. 5 determination whether or not a count value N for each of stimulus values X, Y, Z is smaller than a predetermined value Nmax is executed by the CPU 105 (at steps #105, #112 in FIG. 6), such determination is executed, in the third embodiment, by an externally provided circuit. It is to be noted that, in FIG. 7, like elements or components are denoted by like reference symbols to those of FIG. 5, and detailed description thereof may be omitted herein to avoid redundancy.

Figure 7:
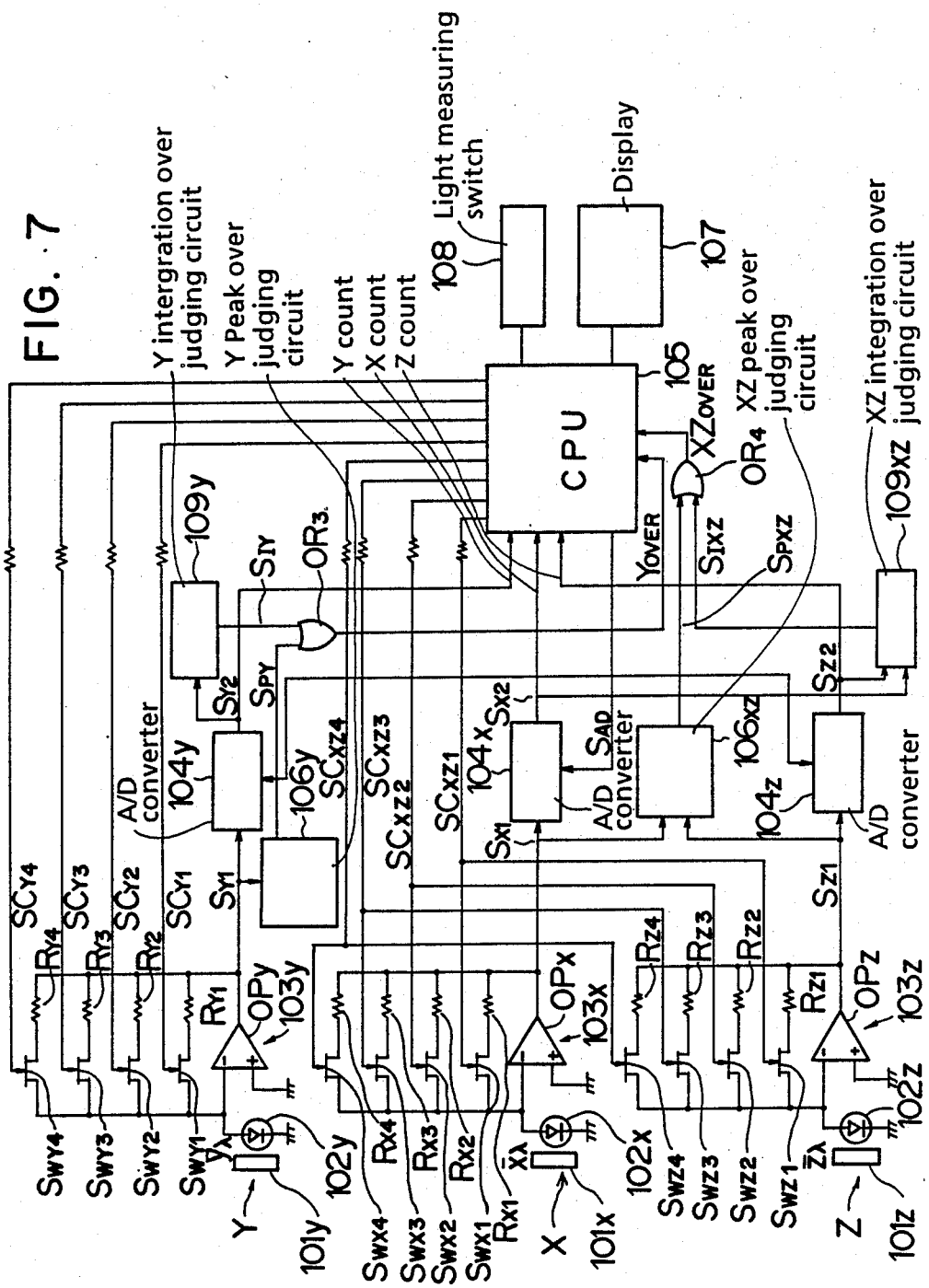
FIG. 7 is a block circuit diagram of another photoelectric colorimeter illustrating a third embodiment of the invention.

The circuit shown in FIG. 7 additionally includes a Y integration over judging circuit 109y connected to receive an output signal $S_{Y2}$ of an analog to digital converter 104y. The Y integration over judging circuit 109y judges whether or not the count value N as represented by the output signal $S_{Y2}$ of the analog to digital converter $104y$ is smaller than the aforementioned value Nmax, and in case the count value N is not smaller than Nmax, then the Y integration over judging circuit $109y$ delivers a signal $S_{IY}$ therefrom. Outputs of the Y peak over judging circuit $106y$ and the Y integration over judging circuit $109y$ are both delivered to an OR gate $OR_3$. Accordingly, when an output signal $S_{PY}$ from the Y peak over judging circuit $106y$ or an output signal $S_{IY}$ from the Y integration over judging circuit $109y$ is received, the OR gate $OR_3$ delivers a signal $Y_{OVER}$ to a CPU 105.

The circuit shown in FIG. 7 further includes an XZ integration over judging circuit $109xz$ connected to receive output signals $S_{X2}$, $S_{Z2}$ of analog to digital converters $104x$, $104z$, respectively. The XZ integration over judging circuit $109xz$ judges whether or not a larger one of count values of the output signals $S_{X2}$, $S_{Z2}$ of the analog to digital converters $104x$, $104y$ is smaller than the aforementioned value Nmax, and in case the larger count value is not smaller than Nmax, then the XZ integration over judging circuit $109xz$ delivers a signal $S_{IXZ}$ therefrom. Outputs of an XZ peak over judging circuit $106xz$ and the XZ integration over judging circuit $109xz$ are both delivered to an OR gate $OR_4$. Accordingly, when an output signal $S_{PXZ}$ from the XZ peak over judging circuit $106xz$ or an output signal $S_{IXZ}$ from the XZ integration over judging circuit $109xz$ is received, the OR gate $OR_4$ delivers a signal $XZ_{OVER}$ to the CPU 105.

Figure 8:
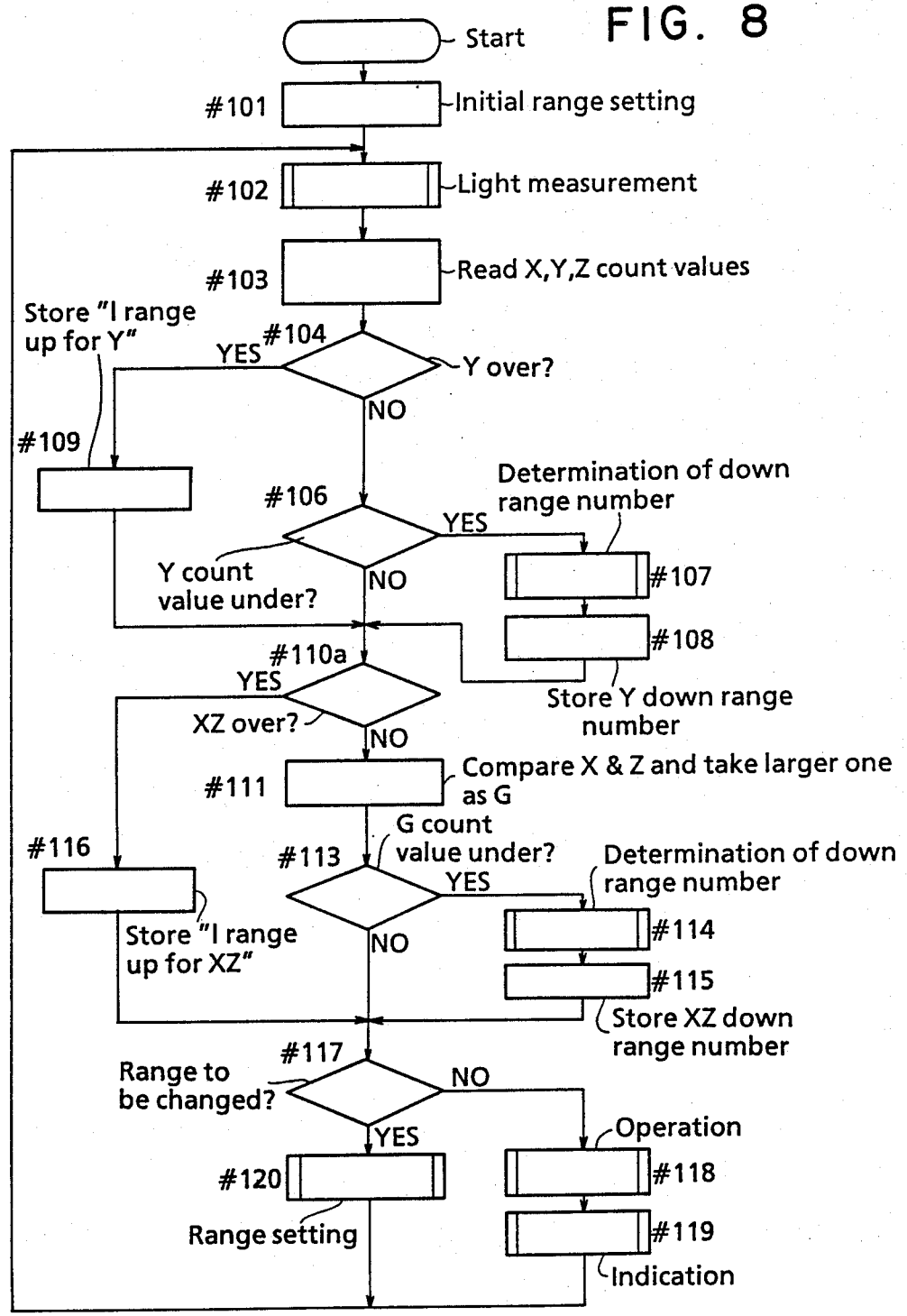
FIG. 8 is a flow chart illustrating operation of the photoelectric colorimeter of FIG. 7.

Operation of the CPU 105 in the third embodiment is illustrated in FIG. 8. Comparison of the flow chart of FIG. 8 with the flow chart of FIG. 6 which illustrates operation of the CPU 105 in the second embodiment will first reveal that, in the flow chart of FIG. 8, it is determined at step #104a whether or not an output signal $Y_{OVER}$ of the OR gate $OR_3$ is received by the CPU 105. Then, if a signal $Y_{OVER}$ is not received by the CPU 105, the program advances directly to step #106 because there is no necessity of changing over the gain of the corresponding amplifying circuit, but on the contrary if a signal $Y_{OVER}$ is received by the CPU 105, the program advances to step #109 in order to change over the gain of the corresponding amplifying circuit. Accordingly, in the present embodiment, the flow chart does not involve such a step as the step #105 of FIG. 6.

Further, in the flow chart of FIG. 8, it is determined at step #110a whether or not an output signal $XZ_{OVER}$ of the OR gate $OR_4$ is received by the CPU 105. Then, if a signal $XZ_{OVER}$ is not received by the CPU 105, the program advances directly to step #111 because there is no necessity of changing over the gain of the corresponding amplifying circuit, but on the contrary if a signal $XZ_{OVER}$ is received by the CPU 105, the program advances to step #116 in order to change over the gain of the corresponding amplifying circuit. Accordingly, in the present embodiment, the flow chart does not involve such a step as the step #112 of FIG. 6, either.

It is to be noted that while, in the second and third embodiments described above, gain control of the variable gain type amplifier $103x$ for the stimulus value X and gain control of the variable gain type amplifier $103z$ for the stimulus value Z are executed simultaneously at the same level, the present invention is not limited to such a specific manner of gain controls, and the two gain controls may otherwise be executed independently of each other. Further, the number of steps for changeover of gains is not limited to the specific one in the second and third embodiments described above.

Following effects can be anticipated by the second and third embodiments.

Since the judging means and the gain control means for the stimulus value Y are constituted as separate systems from the judging means and the gain control means for the stimulus values X, Z, even if the stimulus value Y (luminance or brightness) is too small, the gain of the variable gain type amplifier for the stimulus value Y can be controlled independently of the gain of the other two variable gain type amplifiers. Accordingly, even where the stimulus value is too small depending upon characteristics of a light source, the output level of the variable gain type amplifier for the stimulus value Y can be automatically set to an appropriate level, and hence the stimulus value can be measured with high accuracy.

Figure 9:
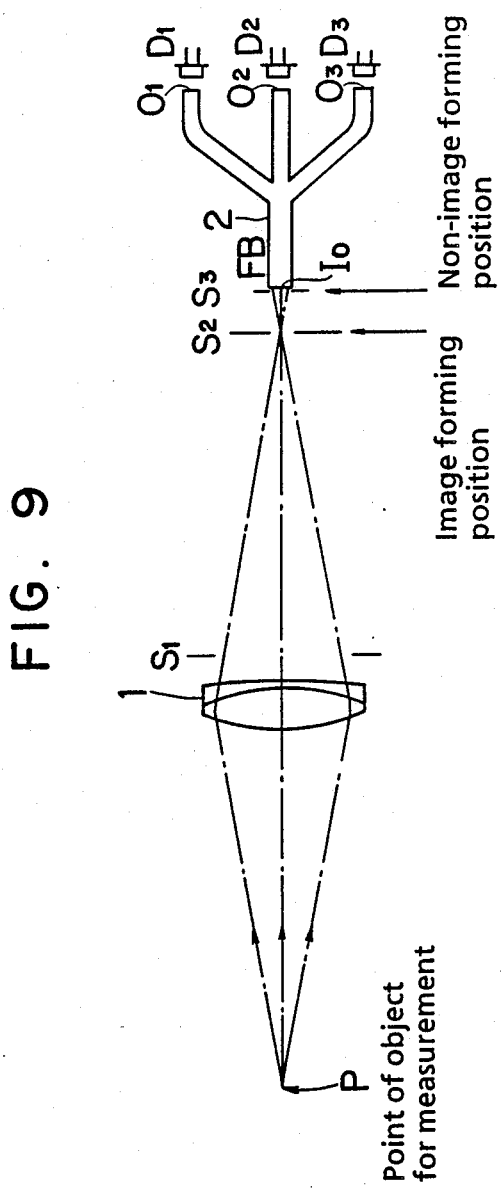
FIG. 9 is a schematic illustration showing general construction of a modification to an optical system of the spot colorimeter of FIG. 1.

FIG. 9 illustrates a modification to the position of the objective lens 1 relative to the optical fiber 2 shown in FIG. 1. Referring to FIG. 9, light from a point P of an object for measurement is condensed by an objective lens 1 to form an image at an image forming position. The light is then received in a defocused condition at an incoming end $I_0$ of a branched optical fiber 2 of a random specification which end is located at a slightly defocused position rearwardly of the image forming position. The light received at the incoming end $I_0$ is then divided uniformly into three light fluxes by the branched optical fiber 2 and goes out from three outgoing ends $O_1$, $O_2$, $O_3$ of the branched opticl fiber 2 and then introduced to three light receiving elements $D_1$, $D_2$, $D_3$ located adjacent the outgoing ends $O_1$, $O_2$, $O_3$ of the branched optical fiber 2. Three limiting plates $S_1$, $S_2$, $S_3$ for limiting a light path are located at a position rearwardly of the objective lens 1, at the image forming position, and at a position forwardly of the incoming end $I_0$ of the branched optical fiber 2, respectively. The limiting plates $S_1$, $S_2$, $S_3$ are used to define an angle of a light flux to be received for measurement and prevent disturbant light from anything other than an object for measurement such as flare from entering the incoming end $I_0$ of the branched optical fiber 2.

FIG. 10 illustrates general construction of the branched optical fiber 2 of a random specification as shown in FIG. 9. As illustrated in FIG. 10, the incoming end $I_0$ of the branched optical fiber 2 presents such as appearance that a large number of optical fiber strands as denoted at ①, ②, ③ are gathered together in a bundle. Thus, of light received at the incoming end $I_0$, those portions received at the optical fiber strands denoted at ① are introduced to the outgoing end $O_1$ of the branched optical fiber 2; those portions received at the optical fiber strands denoted at ② are introduced to the outgoing end $O_2$; and the remaining portions received at the optical fiber strands denoted at ③ are introduced to the outgoing end $O_3$. In this manner, light received at the incoming end $I_0$ is divided into three light beams which go out from the outgoing ends $O_1$, $O_2$, $O_3$ of the branched optical fiber 2. It is to be noted that the arrangement of optical fiber strands at the incoming end $I_0$ of the branched optical fiber is not limited to the specific one as illustrated in FIG. 10 and any arrangement may be allowed only if such optical fiber strands are arranged at random in a bundle.

FIGS. 11a and 11b each illustrate a magnitude of a flux 1 of light received at the incoming end $I_0$ of the branched optical fiber 2 when a small light source is viewed by the optical system. In the case of FIG. 11a, the incoming end $I_0$ of the branched optical fiber 2 is located at the image forming position, and in this position, the incident flux of light 1 is condensed to a very small size. On the other hand, in the case of FIG. 11b, the incoming end $I_0$ of the branched optical fiber 2 is located at a slightly defocused position, and in such position, the incident flux of light 1 is relatively wide and dim.

Figure 12A:
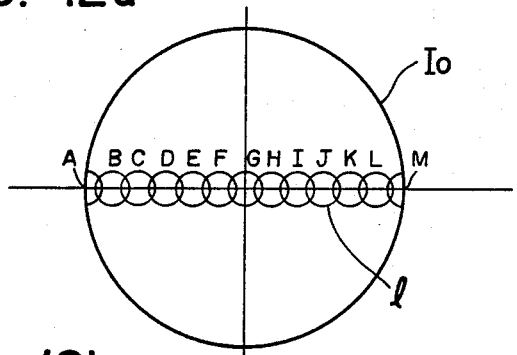
FIG. 12a is a diagrammatic representation illustrating varying positions of an incident light flux at a light incoming end of the optical system of FIG. 1.
Figure 12B:
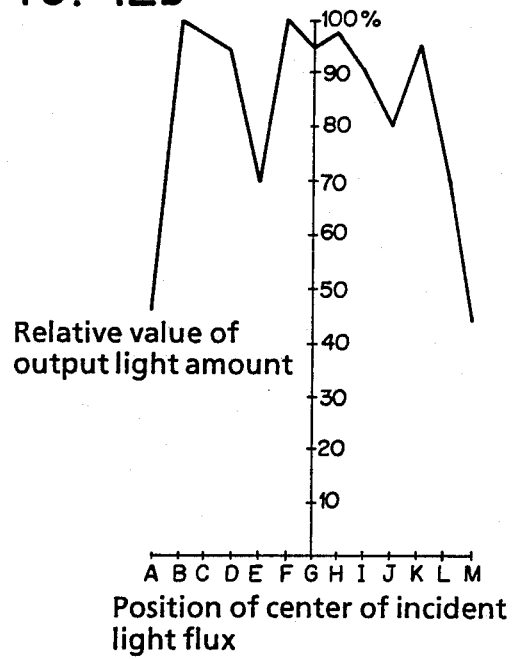
FIG. 12b is a graph illustrating a relation between the positions of an incident light flux and the amount of outgoing light from the optical system of FIG. 1.
Figure 13A:
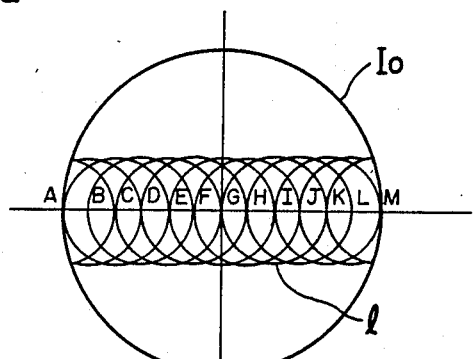
FIG. 13a is a diagrammatic representation illustrating varying positions of an incident light flux at a light incoming end of the optical system of FIG. 9.
Figure 13B:
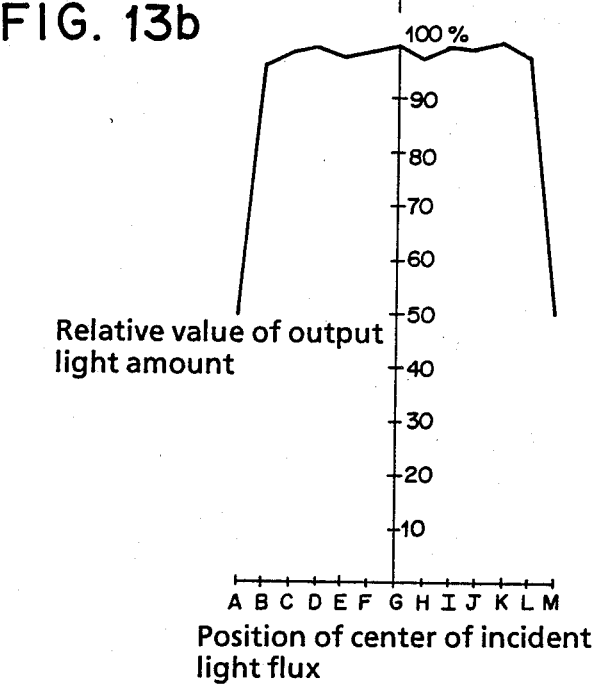
FIG. 13b is a graph illustrating a relation between the positions of an incident light flux and the amount of outgoing light from the optical system of FIG. 9.

FIGS. 12a, 12b and 13a, 13b illustrate relations between positions A, B, C, ..., L, M of the center of an incident flux of light 1 at the incoming end $I_0$ and amounts of output light at the outgoing end $O_1$ (similar at the outgoing ends $O_2$, $O_3$) of the branched optical fiber 2 when a small light source is moved transversely relative to the optical system, and FIGS. 12a, 12b illustrate such relations where the incoming end $I_0$ of the branched optical fiber 2 is located at the image forming position while FIGS. 13a, 13b illustrate such relations where the incoming end $I_0$ of the branched optical fiber 2 is located at a slightly defocused position. As a small light source is moved, the position of the center of a flux of light received at the incoming end $I_0$ of the branched optical fiber 2 moves from A to B, then to C, then to D, ..., to L, and to M. Meanwhile, it is ideal that one third of an incident flux of light is delivered from each of the outgoing ends $O_1$, $O_2$, $O_3$ of the branched optical fiber 2 irrespective of the position of the small light source. However, where the incoming end $I_0$ of the branched optical fiber 2 is located at the image forming position, the influence of the randomness of the branched optical fiber 2 is relatively large because a flux of light 1 received at the incoming end $I_0$ is very small as seen in FIG. 12a. Accordingly, where the randomness of the branched optical fiber 2 is low, the amount of output light will vary depending upon the position of the small light source as seen from FIG. 12b. To the contrary, where the incoming end of the branched optical fiber 2 is located at a slightly defocused position, an incident flux of light 1 presents a large area as shown in FIG. 13a and is dim comparing with that of FIG. 12a. Accordingly, even where the randomness of the branched optical fiber 2 is low, the uniformity in amount of output light is less influenced by the low randomness of the branched optical fiber 2, and accordingly the amount of output light is substantially uniform irrespective of the position of the small light source as seen from FIG. 13b.

It is to be noted that while the description of the modification is given above only of the case wherein incident light is divided into three, it is a matter of course that similar principles apply also to other cases wherein incident light is divided into two, four or more.

Further, while in the modification the incoming end $I_0$ of the branched optical fiber 2 is located at a slightly defocused position rearwardly of the image forming position, it may otherwise be located at a slightly defocused position forwardly of the image forming position.

The modification exhibits an advantage that, since light received from an optical system at the incoming end of the branched optical fiber of a random specification is divided and introduced to the light receiving elements located adjacent the outgoing ends of the branched optical fiber and the incoming end of the branched optical fiber is located at a slightly defocused position of the optical system, there is little restriction to locations of the light receiving elements and circuit systems comparing with a mere arrangement of a plurality of light receiving elements at the image forming position. Besides, the modification has an excellent effect that, due to a multiplied effect of a defocusing effect by the optical system and the randomness of the branched optical fiber, division of light to the individual light receiving elements can be attained uniformly comparing with a case wherein only one of the defocusing effect and the randomness of the branched optical fiber is taken advantage of.

It is to be noted that the modification described above may be applied also to a multicolor radiation thermometer.

While the present invention has been described so far with respect to preferred embodiments wherein it is applied to a spot colorimeter or a photoelectric colorimeter, a light measuring device according to the present invention can be applied to other various appliances some of which are exemplarily listed below.

(1) Color luminance meter for measuring a color and a luminance of an object for measurement.

(2) Colorimeter which irradiates light to an object for measurement and receives reflected light from the object for measuring a color of the object.

(3) Color discriminating device for discriminating to which one of a plurality of preselected colors the color of an object for measurement corresponds.

(4) Two color radiation thermometer for measuring a temperature of an object for measurement without contacting the same. Brief description will be given below of the two color radiation thermometer.

Energy E of light of a wavelength $\lambda$ irradiated from an object for measurement of an absolute temperature T is given by an equation $$E(\lambda,T) = \epsilon(\lambda,T) \cdot P(\lambda,T) = \epsilon(\lambda,T) \frac{C_1}{\lambda^5} \cdot \frac{1}{\exp(C_2/\lambda \cdot T) - 1}$$

where $C_1$, $C_2$ are constants, and $\epsilon$ is an emissivity of the object for measurement.

In a two color radiation thermometer, a branched optical fiber having a single input end and two output ends may be used. The optical fiber is located so that light irradiated from an object for measurement may be received at the input end thereof. Two light receiving elements having spectral sensitivities to light of wavelengths $\lambda_1$, $\lambda_2$ are located adjacent the output ends of the optical fiber. In this instance, outputs $A_1$, $A_2$ of the light receiving elements are given by following equations.

$$A_1 = K \cdot E(\lambda_1,T) = K \cdot \epsilon(\lambda_1,T) = K \cdot \epsilon(\lambda_1,T) \cdot P(\lambda_1,T)$$

$$A_2 = K \cdot E(\lambda_2,T) = K \cdot \epsilon(\lambda_2,T) = K \cdot \epsilon(\lambda_2,T) \cdot P(\lambda_2,T)$$

where K is a constant determined by the optical fiber and the sensitivities of the light receiving elements. The outputs $A_1$, $A_2$ of the light receiving elements are then converted from analog into digital values to obtain corresponding count values $N_1$, $N_2$, and the count values $N_1$, $N_2$ are then taken into a CPU. The CPU thus performs a dividing operation of the two count values $N_1$, $N_2$ to obtain a result B.

$$B = \frac{N_1}{N_2} = \frac{A_1}{A_2} = \frac{K \cdot \epsilon(\lambda_1,T) \cdot P(\lambda_1,T)}{K \cdot \epsilon(\lambda_2,T) \cdot P(\lambda_2,T)} = \frac{\epsilon(\lambda_1,T) \cdot P(\lambda_1,T)}{\epsilon(\lambda_2,T) \cdot P(\lambda_2,T)}$$

Here, if the two wavelengths $\lambda_1$, $\lambda_2$ are close to each other, then $$\epsilon(\lambda_1,T) = \epsilon(\lambda_2,T)$$

Accordingly, B is given by an equation $$B = \frac{P(\lambda_1, T)}{P(\lambda_2, T)}$$

Here, since B is obtained as a result of a dividing operation of the count values $N_1$, $N_2$ while $\lambda_1$, $\lambda_2$ are known values, the absolute temperature T of the object for measurement can be determined from those values using the last equation. Thus, the two color radiation thermometer measures a radiation temperature of an object for measurement involving such an operation as described above and is called as such because light of two wavelengths is used for measurement.

Having now fully described the invention, it will be apparent to one of ordinary skill in the art that many changes and modifications can be made thereto without departing from the spirit and scope of the invention as set forth herein.

What is claimed is:

1. A light measuring device, comprising:
   a plurality of light receiving means having different spectral sensitivities;
   a plurality of first converting means for converting outputs of said light receiving means into corresponding electric signals;
   a plurality of analog memory means each having a memory capacitor for accumulating each of said electric signals;
   a plurality of second converting means for converting the electric signals from said analog memory means individually into corresponding digital signals;
   controlling means for controlling said second converting means to perform individual operations thereof at the same time, and
   a branched optical fiber having a common input end and a plurality of output ends, said branched optical fiber having therein a plurality of mutually independent light transmission paths for introducing light from said input end to said output ends, said output ends of said branched optical fiber being located in an individually opposing relationship to said light receiving means.

2. A light measuring device according to claim 1, wherein each of said second converting means includes integrating means for integrating an electric signal from a corresponding one of said analog memory means, and counting means for providing a count value in accordance with a result of integration of the electric signal by said integrating means, whereby said second converting means perform analog to digital conversion of the double integration type.

3. A light measuring device according to claim 1, further comprising optical means for forming an image of an object for measurement at or adjacent a position of said input end of said branched optical fiber.

4. A light measuring device, comprising:
   a plurality of light receiving means;
   image forming means for forming an image of an object for measurement on a predetermined image forming plane; and
   an optical fiber including a plurality of optical fiber strands and having a plurality of output ends each of which is constituted by a respective subgroup of said strands, said ends being located in an individually opposing relationship to said light receiving means and said optical fiber also having an input end located at a position displaced from the image forming plane, said strands being so bundled that the strands of each subgroup are positioned at random at said input end.

5. A light measuring device according to claim 4, wherein said plurality of light receiving means have different spectral sensitivities.

6. A light measuring device, comprising:
   a plurality of light receiving means having different spectral sensitivities;
   image forming means for forming an image of an object for measurement on a predetermined image forming plane;
   a plurality of first converting means for converting outputs of said light receiving means into corresponding electric signals;
   a plurality of analog memory means each having a memory condenser for accumulating each of said electric signals;
   a plurality of second converting means for converting the electric signals from said analog memory means individually into corresponding digital signals;
   controlling means for controlling said second converting means to perform individual operations thereof at the same time, and
   an optical fiber including a plurality of optical fiber strands and having a plurality of output ends each of which is constituted by respective subgroup of said strands, said ends being located in an individually opposing relationship to said light receiving means, said optical fiber also having an input end being located at a position displaced from the image forming plane, said strands being so bundled that the strands of each subgroup are positioned at random at said input end.

* * * * *